United States Patent
Feld et al.

(10) Patent No.: US 9,438,288 B2
(45) Date of Patent: Sep. 6, 2016

(54) SYSTEM PROVIDING REDUCED INTERMODULATION DISTORTION

(71) Applicant: Avago Technologies General IP (Singapore) Pte. Ltd., Singapore (SG)

(72) Inventors: David A. Feld, Newark, CA (US); Bart Jansen, Pacifica, CA (US)

(73) Assignee: Avago Technologies General IP (Singapore) Pte. Ltd., Singapore (SG)

(*) Notice: Subject to any disclaimer, the term of this patent is extended or adjusted under 35 U.S.C. 154(b) by 603 days.

(21) Appl. No.: 13/708,538

(22) Filed: Dec. 7, 2012

(65) Prior Publication Data

US 2014/0162712 A1 Jun. 12, 2014

(51) Int. Cl.
| | |
|---|---|
| *H04B 1/04* | (2006.01) |
| *H04B 1/10* | (2006.01) |
| *H04B 1/525* | (2015.01) |
| *H04B 15/04* | (2006.01) |
| *H04B 15/06* | (2006.01) |

(52) U.S. Cl.
CPC ............ *H04B 1/109* (2013.01); *H04B 1/525* (2013.01); *H04B 15/04* (2013.01); *H04B 15/06* (2013.01)

(58) Field of Classification Search
CPC ...... H04B 1/006; H04B 15/04; H04B 15/06; H04B 1/0057; H04B 1/109; H04B 1/525
See application file for complete search history.

(56) References Cited

U.S. PATENT DOCUMENTS

| | | | |
|---|---|---|---|
| 3,805,285 A | 4/1974 | Kinjo et al. | |
| 5,587,620 A | 12/1996 | Ruby et al. | |
| 5,873,153 A | 2/1999 | Ruby et al. | |
| 6,107,721 A | 8/2000 | Lakin | |
| 6,507,983 B1 | 1/2003 | Ruby et al. | |
| 7,403,758 B2 | 7/2008 | Rector | |
| 7,646,260 B2 | 1/2010 | Prikhodko et al. | |
| 8,150,350 B2 | 4/2012 | Pratt et al. | |
| 2006/0001506 A1* | 1/2006 | Razmpoosh | H01P 5/12 333/125 |
| 2006/0066419 A1* | 3/2006 | Iwaki | H03H 7/46 333/133 |
| 2006/0071838 A1* | 4/2006 | Runals | H03F 1/34 341/155 |
| 2008/0122554 A1* | 5/2008 | Harada | H03H 9/0561 333/25 |
| 2009/0167426 A1* | 7/2009 | Groiss | H03H 11/1291 327/553 |
| 2009/0315640 A1 | 12/2009 | Umeda et al. | |
| 2010/0026547 A1 | 2/2010 | Weissman et al. | |
| 2011/0169589 A1 | 7/2011 | Franzon et al. | |
| 2011/0190028 A1 | 8/2011 | Hahn et al. | |
| 2011/0299162 A1* | 12/2011 | Chen | G02B 27/283 359/489.08 |
| 2012/0083229 A1* | 4/2012 | Kenington | H04B 1/0483 455/114.3 |
| 2012/0146698 A1 | 6/2012 | Caron | |
| 2012/0146699 A1 | 6/2012 | Caron | |
| 2012/0146742 A1 | 6/2012 | Caron et al. | |

(Continued)

FOREIGN PATENT DOCUMENTS

WO WO2012041739 9/2011

OTHER PUBLICATIONS

Co-pending U.S. Appl. No. 13/341,797, filed Dec. 30, 2011.

(Continued)

*Primary Examiner* — Bobbak Safaipour

(57) ABSTRACT

A system divides a signal into first and second portions and transmits the first and second portions through different signal paths between a first port and a second port. Each of the signal paths comprises an amplifier arranged in sequence with a passive device. Phase shifters may be included in each of the signal paths to produce cancellation of intermodulation products by destructive interference.

20 Claims, 11 Drawing Sheets

(56) References Cited

U.S. PATENT DOCUMENTS

| | | | |
|---|---|---|---|
| 2012/0182086 A1* | 7/2012 | Hase | H03F 1/565 333/124 |
| 2012/0238230 A1 | 9/2012 | Tombak et al. | |
| 2012/0243447 A1* | 9/2012 | Weissman | H04B 1/0458 370/280 |
| 2013/0169378 A1* | 7/2013 | Kim | H03H 9/70 333/126 |
| 2013/0244599 A1* | 9/2013 | Kaukovuori | H04L 5/001 455/102 |

OTHER PUBLICATIONS

Gregory James Mazzaro, "Time-frequency Effects in Wireless Communication Systems", http://ww.lib.nscsu.edu/resolver/1840.16/4523, Issue Date: Oct. 5, 2009, pp. 1-241.

* cited by examiner

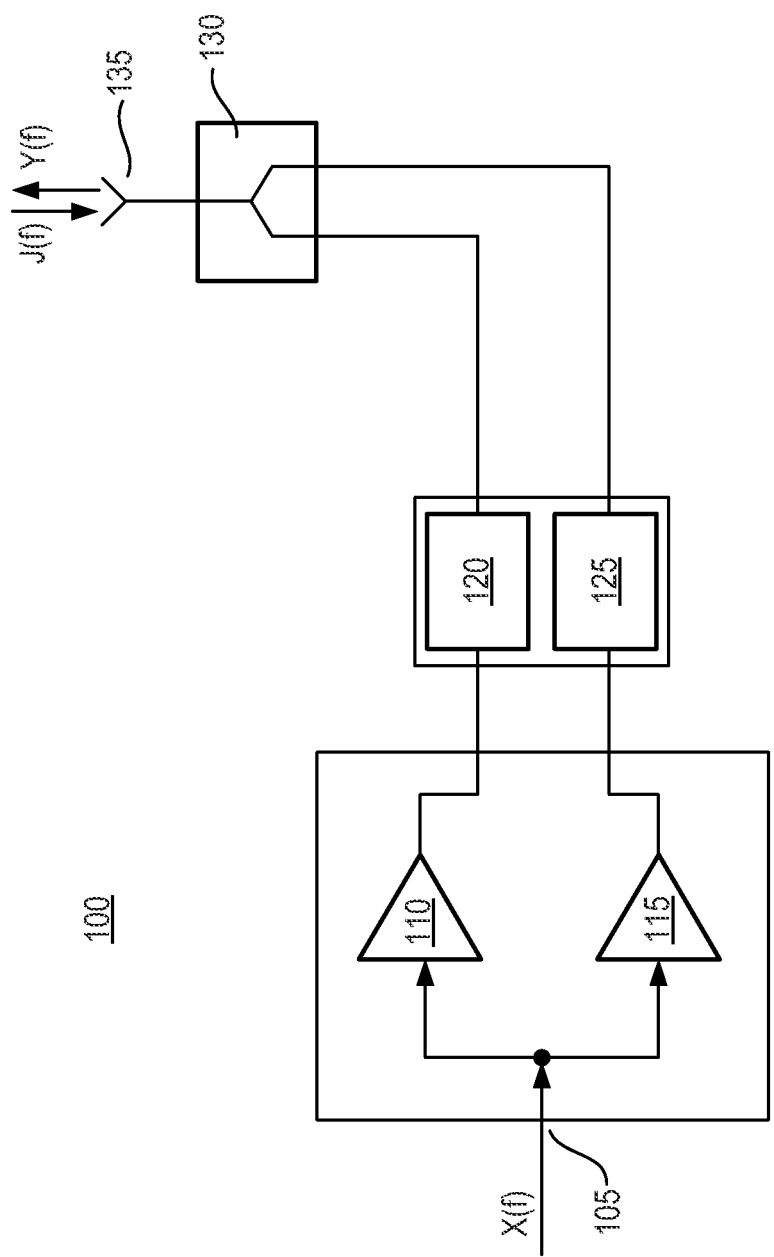

SYSTEM PROVIDING REDUCED INTERMODULATION DISTORTION

BACKGROUND

Intermodulation distortion is a type of signal distortion produced in nonlinear systems by amplitude modulation between signals of different frequencies. For example, intermodulation distortion is commonly produced in duplexers by amplitude modulation between transmitted and received signals, or between transmitted or received signals and external jammer signals.

Intermodulation distortion typically comprises a collection of distortion components at specific frequencies determined by the frequencies of the intermodulated signals (hereafter, "intermodulated signal frequencies"). These distortion components are referred to as intermodulation products. Intermodulation products are generally located both at harmonic frequencies of the intermodulated signal frequencies and at multiples of sum and difference frequencies of the intermodulated signal frequencies. For example, in a system having intermodulated signals, e.g., transmitted, received, and/or jammer signals, at frequencies F0, F1, F2, . . . , intermodulation products may be generated at frequencies nF0+mF1+pF2+ . . . , where n, m, and p are integers.

Intermodulation products can cause significant problems in many systems. As one example, in communication systems, some intermodulation products may fall within a frequency band of a transmitter or receiver, which can interfere with transmission or reception of a desired signal. As another example, intermodulation products may fall in sideband regions of a transmitted or received signal, which can increase the occupied bandwidth and lead to adjacent channel interference.

To address the above problems, some systems use filtering to eliminate or reduce the magnitude of certain intermodulation products. For example a notch filter may be placed at an antenna port of a duplexer to pass transmit and receive signals while notching out any jammer signals that may otherwise lead to intermodulation products. However, if the jammer signals are located close in frequency to the transmit and receive signals, the required notch filter will typically have a high insertion loss and may also give rise to its own third order intermodulation products. Additionally, the notch filter may need to be tunable to be able to reject the undesired jammer while passing the desired transmit and receive signals. Such a notch filter would need to be simultaneously tunable, linear, and highly frequency selective.

An alternative approach that does not require filtering is to use phase shifting to produce versions of intermodulation products that cancel each other by destructive interference. Examples of this approach are disclosed in U.S. patent application Ser. No. 13/341,797 entitled "Apparatus Having Double Phase Matched Configuration for Reducing Magnitude of Intermodulation Products", the subject matter of which is hereby incorporated by reference. Although the disclosed examples can effectively reduce intermodulation products caused by the presence of jammer signals, they may require Wilkinson devices to split or recombine the applied transmit or jammer signals to absorb differential mode as well as common mode reflections that are caused by small mismatches at the ports where the signals are connected to the ports of the duplexer or filter. These differential mode reflections, if not absorbed by the Wilkinson combiner would otherwise be converted into frequency dependent common mode signals that would interfere with both the proper linear operation of the net duplexer or filter function of the overall topology as well as with the proper third-order intermodulation distortion phase cancellation scheme. The presence of the Wilkinson devices, however, can result in undesirable levels of insertion loss. For example, a Wilkinson device at a transmit port may result in undesired insertion loss in a signal path between the transmit port and an antenna port.

In view of the above and other shortcomings of conventional technologies, there is a general need for approaches that reduce, remove, or eliminate intermodulation products without creating undesirable amounts of insertion loss.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

FIG. 1 is a diagram of a transmitter system configured to reduce intermodulation distortion according to a representative embodiment.

DETAILED DESCRIPTION

Figure 2A:
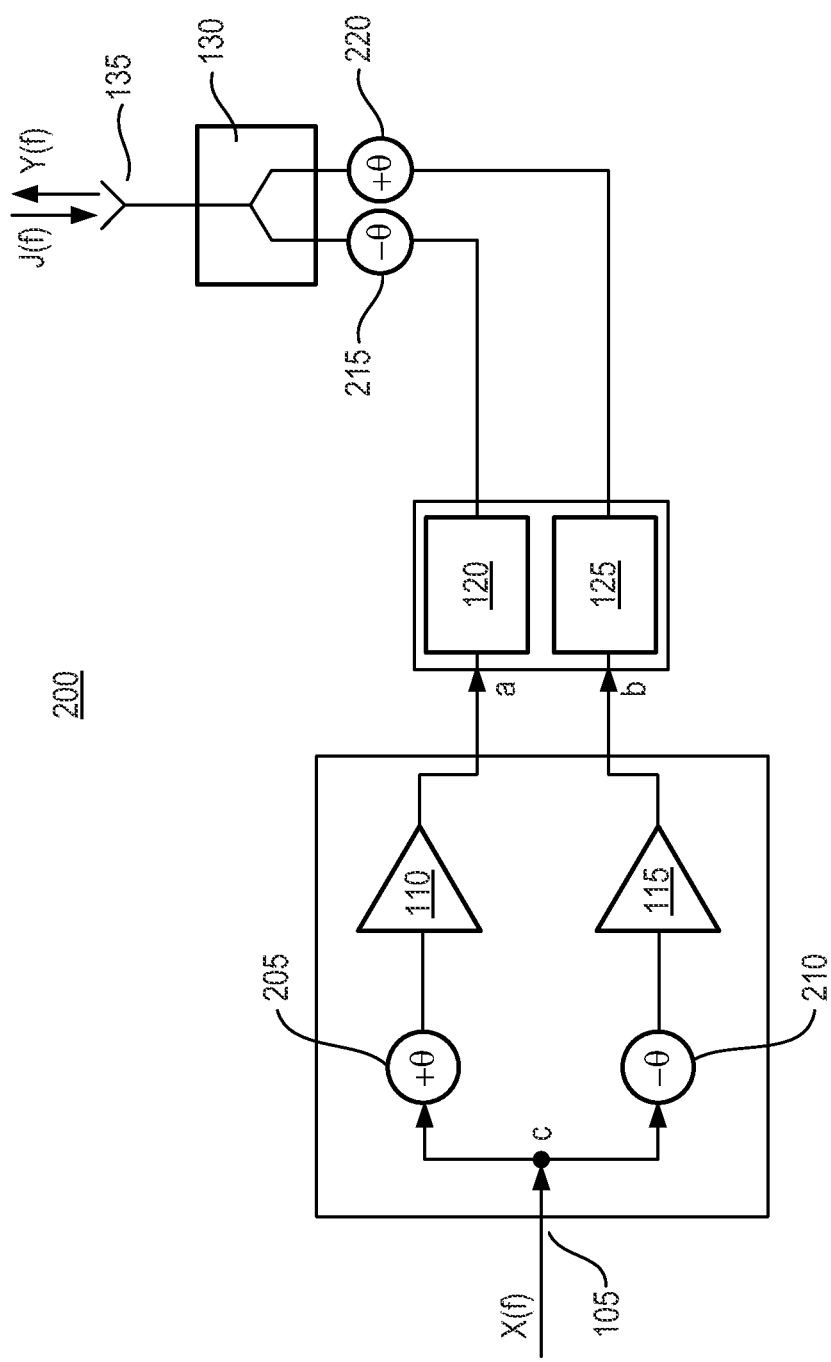
FIGS. 2A through 2C are diagrams of various transmitter systems configured to reduce intermodulation distortion according to other representative embodiments.

In the following detailed description, for purposes of explanation and not limitation, example embodiments disclosing specific details are set forth in order to provide a thorough understanding of the present teachings. However, it will be apparent to one having ordinary skill in the art having the benefit of the present disclosure that other embodiments according to the present teachings that depart from the specific details disclosed herein remain within the scope of the appended claims. Moreover, descriptions of well-known apparatuses and methods may be omitted so as to not obscure the description of the example embodiments. Such methods and apparatuses are clearly within the scope of the present teachings.

The terminology used herein is for purposes of describing particular embodiments only, and is not intended to be limiting. The defined terms are in addition to the technical, scientific, or ordinary meanings of the defined terms as commonly understood and accepted in the relevant context.

The terms 'a', 'an' and 'the' include both singular and plural referents, unless the context clearly dictates otherwise. Thus, for example, 'a device' includes one device and plural devices. The terms 'substantial' or 'substantially' mean to within acceptable limits or degree. The term 'approximately' means to within an acceptable limit or amount to one of ordinary skill in the art. Relative terms, such as "above," "below," "top," "bottom," "upper" and "lower" may be used to describe the various elements' relationships to one another, as illustrated in the accompanying drawings. These relative terms are intended to encompass different orientations of the device and/or elements in addition to the orientation depicted in the drawings. For example, if the device were inverted with respect to the view in the drawings, an element described as "above" another element, for example, would now be below that element. Other relative terms may also be used to indicate the relative location of certain features along a path such as a signal path. For instance, a second feature may be deemed to "follow" a first feature along a signal path if a signal transmitted along the path reaches the second feature before the second feature.

The term "radio frequency" or "RF" pertains to VHF, UHF, SHF, microwave and even millimeter wave frequencies to the extent that technology permits the devices and circuits disclosed herein to be fabricated and operated at such frequencies. Where a first device is said to be connected or coupled to a second device, this encompasses examples where one or more intermediate devices may be employed to connect the two devices to each other. In contrast, where a first device is said to be directly connected or directly coupled to a second device, this encompasses examples where the two devices are connected together without any intervening devices other than electrical connectors (e.g., wires, bonding materials, etc.).

The described embodiments relate generally to techniques for reducing intermodulation distortion in various types of communication systems. For example, certain embodiments can be used to reduce intermodulation distortion in communication systems that use duplexers to process transmitted and received signals—systems such as communication handsets (e.g., cell phones, two-way radios) and base stations (e.g., cell phone towers, etc.).

In some embodiments, a reduction of intermodulation distortion is achieved by a power amplifier and/or a low noise amplifier each divided into two halves. The division of these components reduces the power going into each one, which tends to reduce the overall magnitude of amplified intermodulation products, improving the linearity of device response and reducing adjacent channel interference. In some embodiments, a further reduction of intermodulation distortion is achieved by placing phase shifters at the input side of the two halves of the power amplifier and/or at the output side of the two halves of the low noise amplifier to produce versions of intermodulation products that cancel each other by destructive interference. This arrangement can eliminate a need to place Wilkinson devices at transmit and receive ports, which can reduce insertion loss.

FIG. 1 is a diagram of a transmitter system 100 configured to reduce intermodulation distortion according to a representative embodiment. Transmitter system 100 can be used, for instance, to process and output a transmit signal with reduced intermodulation distortion.

Referring to FIG. 1, transmitter system 100 comprises a first port 105, first and second power amplifiers 110 and 115, first and second passive devices 120 and 125, a Wilkinson device 130, and a second port 135, which as noted below may be a transmit/receive (T/R) port. First and second ports 105 and 135 can also be referred to as a transmit port and an antenna port, respectively. Transmitter system 100 comprises two different signal paths between first and second ports 105 and 135. In particular, it comprises a first signal path comprising first power amplifier 110, first passive device 120, and Wilkinson device 130, and a second signal path comprising second power amplifier 115, second passive device 125, and Wilkinson device 130.

First and second passive devices 120 and 125 can comprise passive components such as resistors, capacitors, inductors, signal traces, crystals, or acoustic resonator technologies. Examples of the acoustic resonator technologies include stacked bulk acoustic resonator (SBAR), film bulk acoustic resonators (FBAR), and double bulk acoustic resonators (DBAR) technologies, as disclosed for instance, in U.S. Pat. No. 6,107,721, to Lakin and U.S. Pat. Nos. 5,587,620, 5,873,153 and 6,507,983 to Ruby, et al., the subject matter of which is hereby incorporated by reference. In certain embodiments first and second passive devices 120 and 125 are used to implement signal filters, such as notch filters, bandpass filters, and so on.

First and second passive devices 120 and 125 are designed to have closely matched phase and amplitude responses such that they affect the respective phases and amplitudes of the first and second portions in substantially the same way. They are also designed to have substantially the same S-parameters. One way to accomplish these matching characteristics in first and second passive devices 120 and 125, as well as other features described herein, is to fabricate these features using the same processes and/or on the same chip.

During typical operation, first port 105 receives a first signal shown in FIG. 1 with a frequency domain representation X(f). The first signal is divided into two portions corresponding to the respective first and second signal paths. The first portion is amplified by first power amplifier 110, then processed by first passive device 120, and then combined with the second portion in Wilkinson device 130. Similarly, the second portion is amplified by second power amplifier 115, then processed by second passive device 125, and then combined with the first portion in Wilkinson device 130. The combination of the first and second portions produces a second signal at second port 135. The second signal is shown in FIG. 1 with a frequency domain representation Y(f). Also during typical operation, second port 135 receives a jammer signal shown in FIG. 1 with a frequency domain representation J(f).

In general, the first and second signals, as well as the jammer signal, may include substantial components at several different frequencies and/or over a range of frequencies. Moreover, although not shown in FIG. 1 and other drawings, an additional jammer signal may also be present at first terminal 105, which can potentially introduce further intermodulation distortion to be addressed by transmitter system 100 or other described systems. In addition, depending on the type of processing performed by first and second passive devices 120 and 125, the second signal may comprise the same or a different frequency components compared to the first signal. Nevertheless, for simplicity of explanation, it will be assumed that the first and second signals both have a first frequency F1 and the jammer signal has a second frequency F2. First frequency F1 and second frequency F2 may be, for instance, RF or microwave frequencies. These frequencies can be employed in mobile communication devices, e.g., mobile telephony devices, such as frequencies employed in various countries for GSM, CDMA, LTE and similar communication systems.

For at least some types of first and second passive devices 120 and 125, the jammer signal may mix with the second signal at the respective output ports of those devices. This mixing may produce intermodulation products at various frequencies (e.g., IMD3, IMD5, etc.) as will be apparent to those skilled in the art. However, because the first and second portions of the first signal are transmitted through two different signal paths, power is distributed between two sets of components. This reduces the power density of the first signal in each of first and second passive devices 120 and 125, and it also reduces the power density of the jammer signal impinging on passive devices 120 and 125. This reduction in power density tends to reduce the magnitude of intermodulation products that may affect the adjacent channel power ratio (ACPR) of transmitter system 100, and it can also increase the overall power handling of the passive devices by 3 dB.

Although transmitter system 100 and other systems presented herein are described as including one or more Wilkinson devices for performing signal splitting and/or combining operations, the described Wilkinson device(s) could potentially be replaced with other components capable of performing the same or comparable operations. As an example, one or more of the described Wilkinson devices could be replaced with an alternative device designed to perform the following functions: (a) split a signal, and at the same time impedance transform the signal if necessary, (b) absorb any signals arriving from a split port side of the device such that power is not reflected back from the device into two corresponding loads. Such an alternative device could be implemented in a variety of different ways. For example, it could be implemented with components substantially similar to a Wilkinson device, but with a resistor replaced with another type of absorbing element.

In transmitter system 100 and other systems presented herein, the use of two power amplifiers can potentially eliminate a need to absorb some differential mode reflections because the reverse isolation of the power amplifiers can be controlled to prevent the differential signals from being large enough to produce problematic reflections. Specific examples of this benefit are described below with respect to various embodiments illustrated in FIGS. 2A through 2C.

Figure 2B:
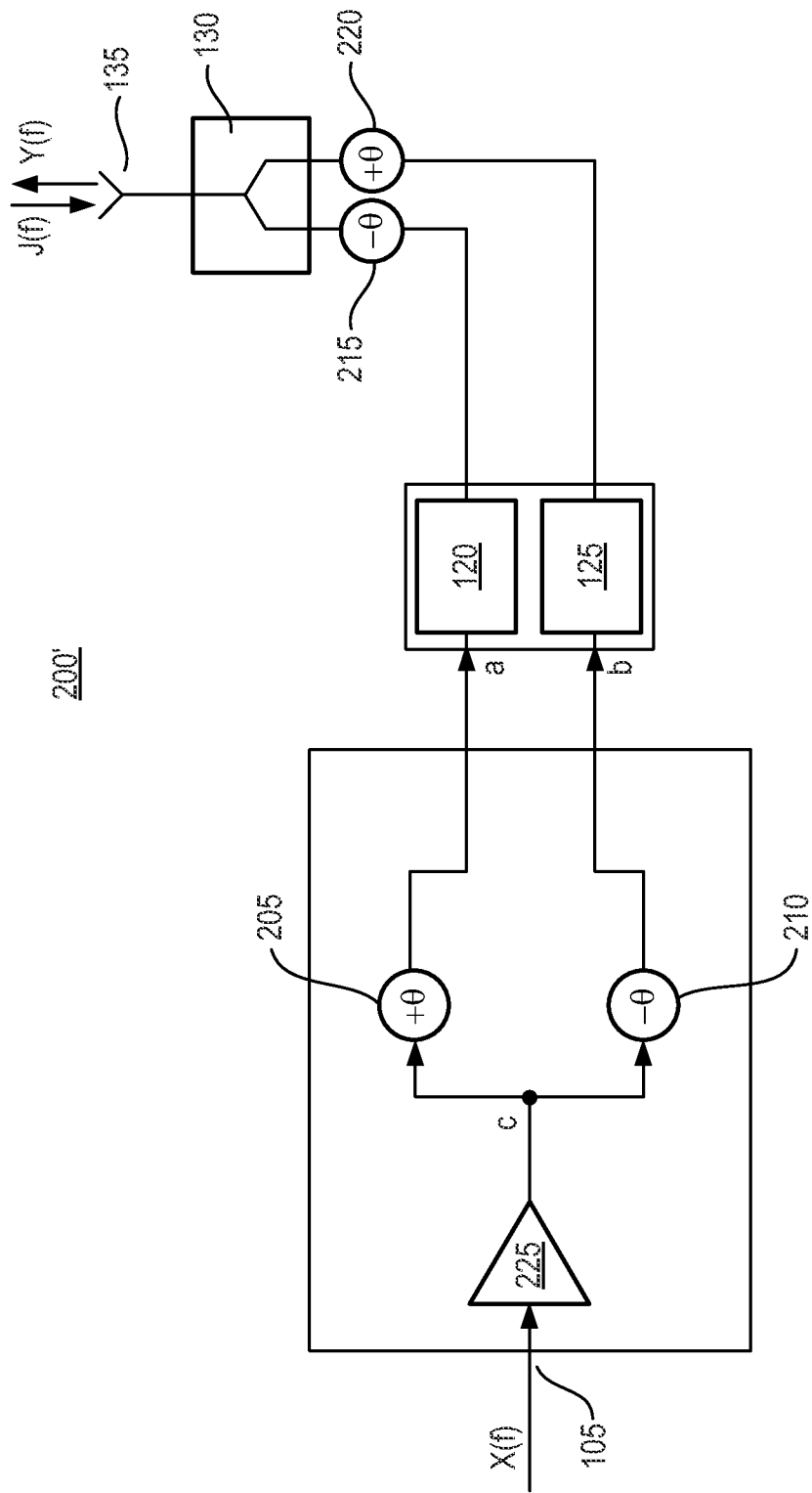
Figure 2C:
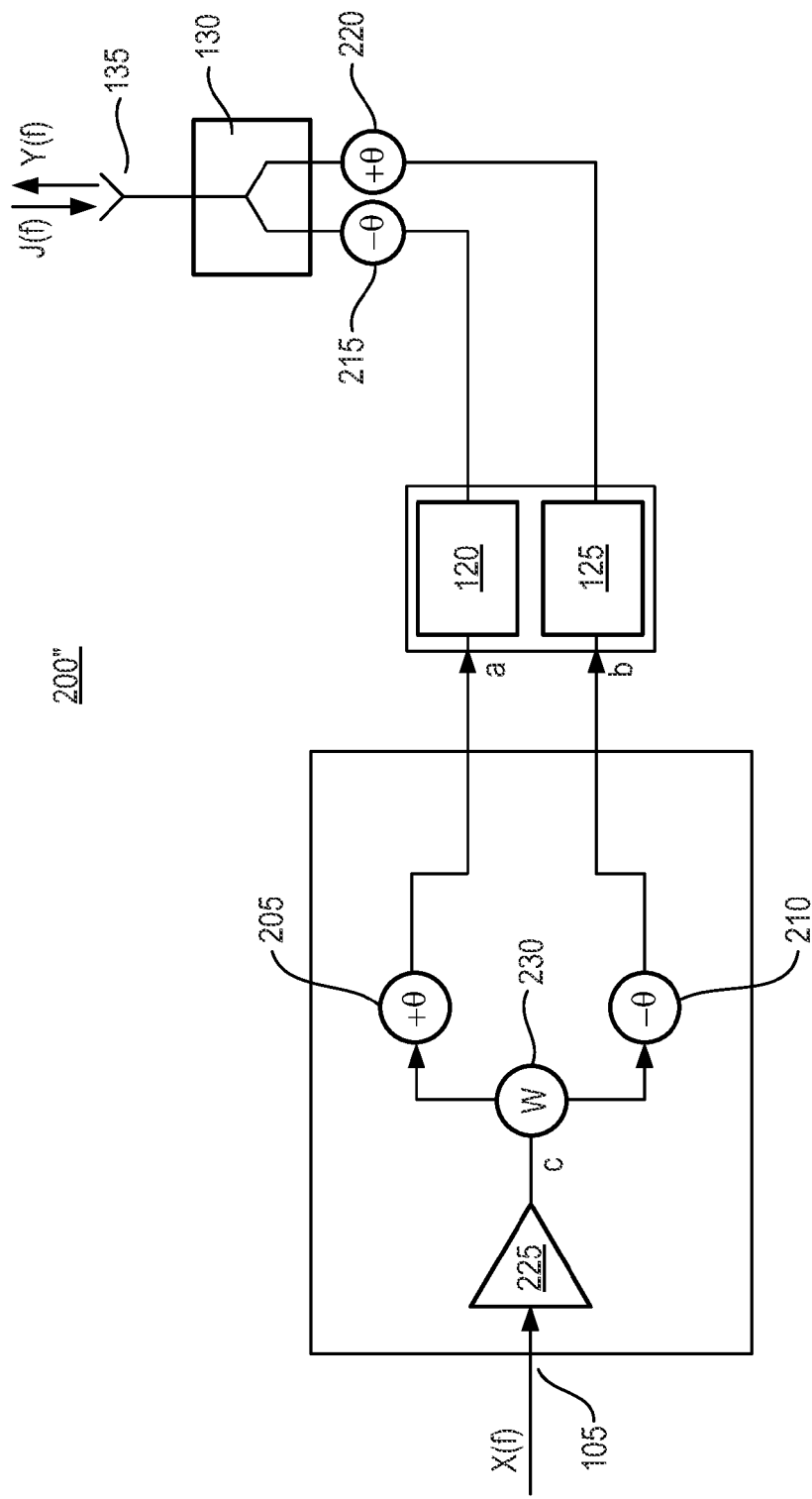

FIGS. 2A through 2C are diagrams of various transmitter systems configured to reduce intermodulation distortion according to other representative embodiments. More particularly, FIG. 2A is a diagram of a transmitter system 200 configured to reduce intermodulation distortion according to another representative embodiment, and FIGS. 2B and 2C are diagrams illustrating variations of transmitter system 200 in order to explain the effects of differential signal reflections in different system configurations. Transmitter system 200 and the described variations use phase shifters with appropriate phase shifts to cancel out an upper or lower intermodulation product at a designated port. These phase shifters are separated from passive devices by corresponding amplifiers. The phase shifters are configured to provide matched phase shifts in the first and second signal pathways, a configuration referred to as a double phase-matched configuration.

Referring to FIG. 2A, transmitter system 200 comprises many of the same features as transmitter system 100, and a further description of these features will be omitted in order to avoid redundancy. In addition, transmitter system 200 further comprises first and second phase shifters 205 and 210 located between first port 105 and respective first and second power amplifiers 110 and 115. Transmitter system 200 still further comprises third and fourth phase shifters 215 and 220 located between first and second passive devices 120 and 125, respectively, and Wilkinson device 130. First and third phase shifters 205 and 215 are located in the first signal path between first port 105 and second port 135, and second and fourth phase shifters 210 and 220 are located in the second signal path between first port 105 and second port 135.

First and fourth phase shifters 205 and 220 are each configured to provide a positive phase shift $+\theta$, and second and third phase shifters 210 and 215 are each configured to provide a negative phase shift $-\theta$. First through fourth phase shifters 205 through 220 may employ any suitable technology to realize the desired phase shift, including, e.g., a transmission line, a switched line (delay line) phase shifter, a switched filter phase shifter, a high-pass/low-pass phase shifter, a loaded line phase shifter, a ferroelectric phase shifter, a varactor phase shifter, a Schiffman phase shifter, or a Hilbert transform device. In addition, each of first through fourth phase shifters 205 through 220, as well as other phase shifters described herein, could be realized with a concatenation of individual phase shifting elements each having their own phase shift amounts that when added together produce the required phase shift amounts. Each of first through fourth phase shifters 205 through 220 typically has a low or minimal loss, and the losses through first and second phase shifters 205 and 210 closely match each other, and the losses through third and fourth phase shifters 215 and 220 also closely match each other.

With the arrangement of phase shifters in transmitter system 200, the phase shift of the first signal through the first signal path is substantially equal to the phase shift of the first signal through the second signal path. Consequently, the first signal is left intact at second port 135. Moreover, if the phase shifts are selected with appropriate magnitudes, intermodulation products in the first and second signal paths may be offset from each other such that they substantially cancel each other out. Examples of phase shifts that can lead to intermodulation products that cancel each other by destructive interference are disclosed in the above-referenced U.S. patent application Ser. No. 13/341,797.

In one example, assume that the respective frequencies F1 of the first signal and F2 of the jammer signal produce third order intermodulation products at two different frequencies FA and FB, where FA=2F1−F2 and FB=2F2−F1. For example, where F1=1 GHz and F2=900 MHZ, then FA would be 1.1 GHz and FB would be 800 MHz. Under these circumstances, FA represents the upper third order intermodulation product, and FB represents the lower third order intermodulation product. On the other hand, if F2 was greater than F1, for example, F1=1 GHz and F2=1.1 GHz, then FA would be 900 MHz and FB would be 1.2 GHz. Under these circumstances, FA represents the lower third order intermodulation product, and FB represents the upper third order intermodulation product.

In some embodiments, $\theta$ may be selected to be approximately $\lambda/8$ (45°) at and around the frequencies F1, F2 and FA. Alternatively, $\theta$ may be selected to be approximately $\lambda/16$ (22.5°) at and around the frequencies F1, F2, and FA. Under both of these circumstances, the third order intermodulation products at the frequency FA=2F1−F2 will be canceled at second port 135. Example mathematical calculations describing the cancellation of one or more third order intermodulation products using phase shifts are explained in further detail in the above-referenced U.S. patent application Ser. No. 13/341,797.

An accurate cancellation of third order intermodulation products generally requires that the cancelled products have substantially the same magnitude and opposite sign at the locus of cancellation. As explained, for instance, in U.S. patent application Ser. No. 13/341,797, these conditions can typically be achieved by appropriately matching circuit components in complementary signal paths. For instance, in transmitter system 200, complementary features in the first and second signal paths can be designed to have substantially the same signal loss. In particular, first and second phase shifters 205 and 210 can be designed to have substantially the same signal loss, first and second power amplifiers 110 and 115 can be designed to have substantially the same signal loss, and so on.

Appropriate matching of first and second passive devices 120 and 125 can typically be achieved under the following conditions. First, the internal circuitry between every pair of nodes inside of each passive device is substantially identical in its electrical behavior—that is the impedance (at frequencies F1, F2, FA, and FB) is substantially identical between any such pair or nodes in each passive device 120 and 125. This allows the power of the first signal and the jammer signal J that flows to and from every node to be identical in passive devices 120 and 125. Second, the power and phase produced at the intermodulation signal frequencies FA and FB by any circuit element between any pair of nodes in each passive device 120 and 125 is identical or near identical.

In transmitter system 200, as in transmitter system 100, some of the reduction in the magnitude of the intermodulation products occurs due to the splitting of power between different devices in first and second signal paths. If the devices are not in saturation with respect to the intermodulation products, so that weak nonlinear power dependence applies, the power density of the first signal and the jammer signal are each reduced by a factor of two due to splitting first signal and the jammer signal into two paths. Hence, the net magnitude of the intermodulation product produced by mixers in each of the signal paths will likely fall by 9 dB relative to a single signal path. In other words, if the phase shift $\theta$ was set to zero, as in transmitter system 100, then the power of the intermodulation products from two passive devices 120 and 125 in parallel with each other would be −6 dB (i.e., −9 dB less per device, multiplied by 2 devices (−3 db)=−6 dB) with respect to the case where a single device were employed. As explained above, by the appropriate choice of phase $\theta$ the lower or upper intermodulation product can be suppressed much more than by 6 dB.

The cancellation or substantial cancellation of the lower or upper intermodulation product using the double phase-matched configuration described above does not require that the device intermodulation products are not in saturation, so that weak nonlinear power dependence applies. As long as first and second passive devices 120 and 125 have internal mixers that generate the same level of intermodulation power independent of the power of the first signal and the jammer signal, the cancellation will occur if the appropriate phase angle $\theta$ is employed. That is, so long first and second passive devices 120 and 125 each have the same or near the same intermodulation power dependence as a function of the power of the first signal and the jammer signal, the cancellation will occur.

In some embodiments, the third order intermodulation cancellation described above may be provided to a large degree even when $\theta$ is not precisely $\lambda/8$ (45°). Indeed, in some embodiments 10 dB reduction of the third order intermodulation product at frequency FA has been observed over a range of ±15% with respect to the value of $\theta$ of $\lambda/8$ (45°).

In some embodiments, $\theta$ may be selected to be approximately $\lambda/16$ (22.5°) at least at the first frequency F1 of the first signal and frequencies near first frequency F1, and/or at second frequency F2 the jammer signal and frequencies near second frequency F2, and/or at the frequency of intermodulation product FB and frequencies near FB. In that case, it can be shown using a similar analysis to that performed above, and under similar conditions, that the third order intermodulation product at the frequency FB=2F2−F1 will be canceled, or substantially canceled, at the second port 145, where again F2 is again a frequency of the jammer signal. For example, in some embodiments the ratio between: (1) the magnitude of the first signal at frequency F1 appearing at second port 135, and (2) the magnitude of the third order intermodulation product at frequency FB appearing at second port 135 may be improved by 20 dB or more compared to the ratio between: (1) the magnitude of the first signal at frequency F1 appearing at the respective output ports of first and second passive devices 120 and 125, and (2) the magnitude of the third order intermodulation product at frequency FB appearing at the respective output ports of first and second passive devices 120 and 125.

In still other embodiments, other values of $\theta$ may be selected to cancel, or substantially cancel, an upper or lower 5th order intermodulation product, an upper or lower 7th order intermodulation product, etc.

Although not shown in FIGS. 1, 2, and other drawings, certain measures may be employed to ensure proper impedance matching between first and second power amplifiers 110 and 115 and first and second passive devices 120 and 125. For example, where first power amplifier 110 has a 50Ω output impedance, passive device 120 should have 50Ω input impedance at its input port. To address this issue, some embodiments may employ an impedance matching network between the amplifiers and the passive devices.

In transmitter system 200, signal reflections may occur at input ports of first and second passive devices 120 and 125, labeled as points "a" and "b". These signal reflections will be absorbed at respective outputs of first and second power amplifiers 110 and 115. Good reverse isolation in these power amplifiers will prevent the absorbed signals from being re-amplified and returned back to points "a" and "b", which will preserve proper linear operation of the net duplexer or filter function of the overall topology as well as the proper third-order intermodulation distortion phase cancellation scheme. This scheme does not require use of Wilkinson combiner, which would add insertion loss into the transmit path.

Referring to FIG. 2B, in a first variation of transmitter system 200, referred to as transmitter system 200', the first signal is amplified by a single power amplifier 225 before it is split into the first and second signal paths. With this configuration, undesired impedance mismatches at points "a" and "b" will cause signals to reflect back to a point "c" where the first signal is split. Because of first and second phase shifters 205 and 210, the reflected signals returning to point c will be part common mode, part differential mode. The common mode portion will be absorbed by the output of single power amplifier 225. The differential portion, however, will be reflected back to points "a" and "b", because point "c" will behave like a differential mode short. These differential mode reflections, if not absorbed may interfere with both the proper linear operation of the net duplexer or filter function of the overall topology as well as with the proper third-order intermodulation distortion phase cancellation scheme.

Referring to FIG. 2C, in a second variation of transmitter system 200, referred to as transmitter system 200", the first signal is amplified by single power amplifier 225 before it is split into the first and second signal paths by a Wilkinson device 230. With this configuration, both common mode and differential mode portions of reflections signals will be absorbed by Wilkinson device 230. This will prevent the reflected signals from returning to points "a" and "b", thus preserving both proper linear operation of the net duplexer or filter function of the overall topology as well as the proper third-order intermodulation distortion phase cancellation scheme. The presence of a Wilkinson device, however, can result in undesirable levels of insertion loss. For example, a Wilkinson device at a transmit port may result in undesired insertion loss in a signal path between the transmit port and an antenna port.

Although not specifically illustrated in relation to other embodiments, the different variations of splitting and power amplification components as illustrated in FIGS. 2B and 2C could also be applied to other types of systems described herein, as will be readily appreciated by those skilled in the art. However, as indicated above, the use of these different variations may present various complications or drawbacks.

Figure 3:
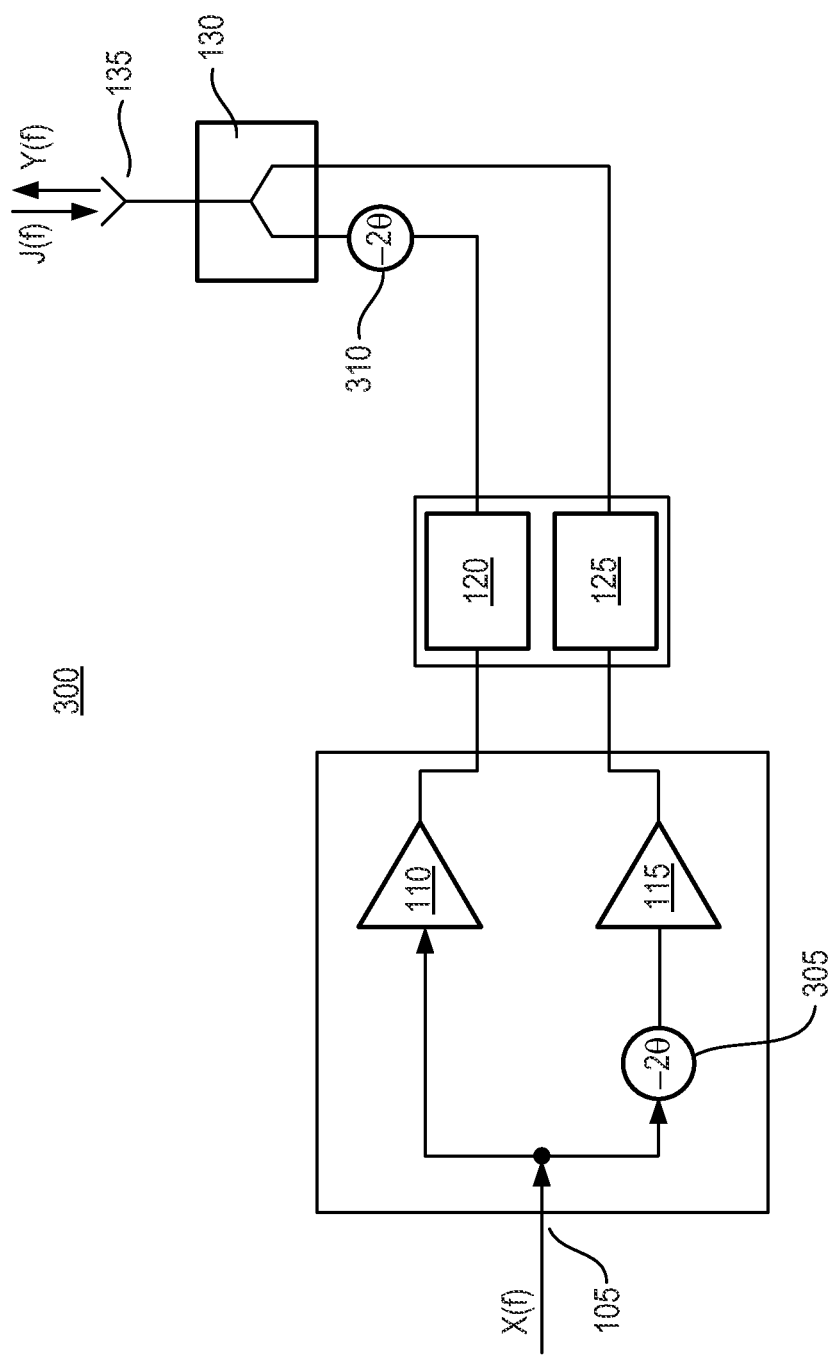
FIG. 3 is a diagram of a transmitter system configured to reduce intermodulation distortion according to another representative embodiment.

FIG. 3 is a diagram of a transmitter system 300 configured to reduce intermodulation distortion according to another representative embodiment. Transmitter system 300 is similar to transmitter system 200 shown in FIG. 2, but it reduces the total number of phase shifters by a factor of two. In particular, if the phase shift of each of the phase shifters of FIG. 2 is either increased by θ or decreased by θ, the resultant system may operate similar to transmitter system 200 with respect to the elimination of an intermodulation product at second port 145, as described above.

Referring to FIG. 3, transmitter system 300 comprises two phase shifters 305 and 310 in contrast to the four phase shifters employed in transmitter system 200. Phase shifters 305 and 310 both have a phase shift of −2θ. Transmitter system 300 may be obtained from transmitter system 200 by subtracting θ from the phase shifts of each of the phase shifters in transmitter system 200. As a result, two of the phase shifters have a phase shift of zero, and may be eliminated, and θ may be selected, as with transmitter system 200, for elimination of an intermodulation product.

Figure 4:
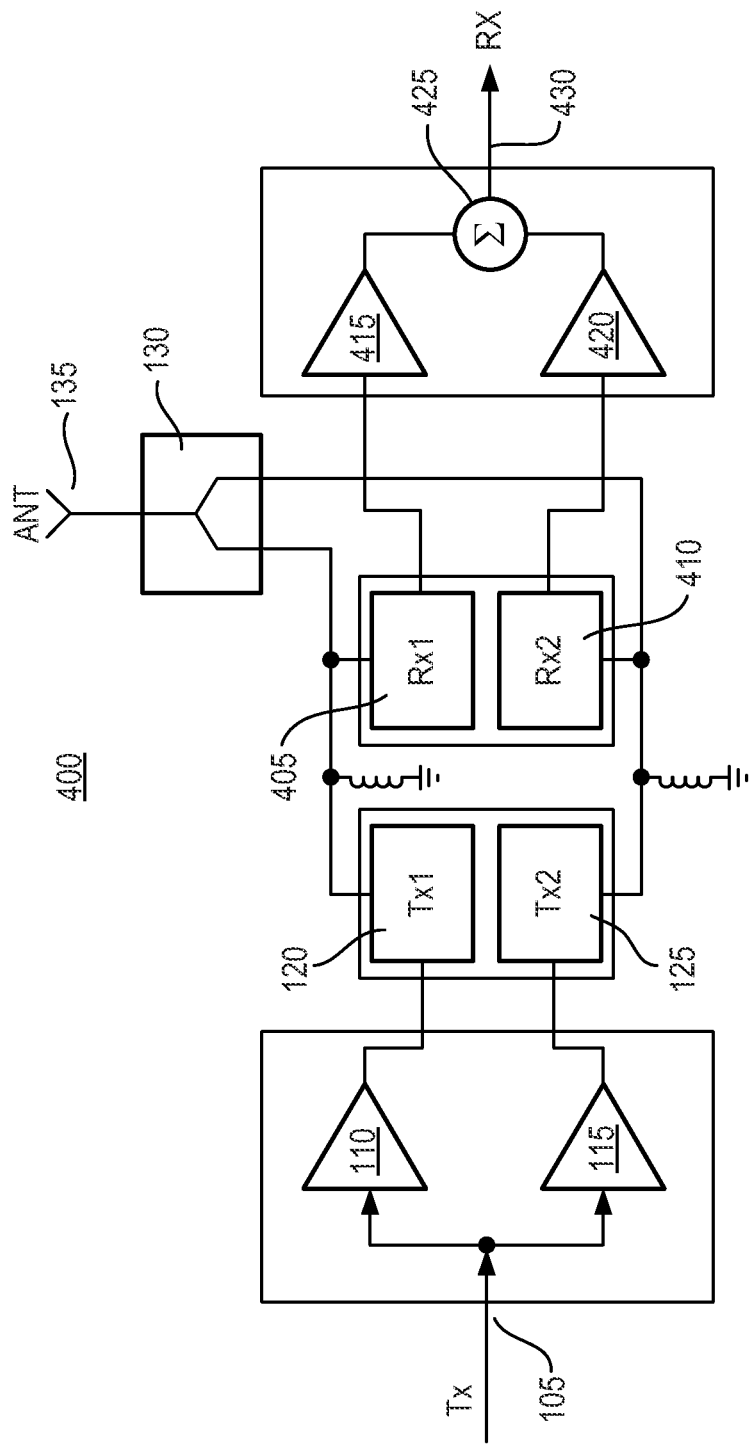
FIG. 4 is a diagram of a duplexer system configured to reduce intermodulation distortion according to another representative embodiment.

FIG. 4 is a diagram of a duplexer system 400 configured to reduce intermodulation distortion according to another representative embodiment. As an extension of transmitter system 100 described above, duplexer system 400 is configured to both transmit and receive signals through an antenna port. In order to process the received signals, duplexer system 400 further comprises additional passive devices. For explanation purposes, it will be assumed in the description of duplexer systems below that the passive devices used to process transmitted and received signals are frequency filters. Accordingly the passive devices may be referred to throughout the remaining description as transmit filters or receive filters. Nevertheless, as indicated above, the passive devices may take various alternative forms and they may be implemented by various alternative technologies.

Referring to FIG. 4, duplexer system 400 comprises some of the same features as transmitter system 100 of FIG. 1, and a further description of those features will be omitted in order to avoid redundancy. In addition, duplexer system 400 comprises a third port 430 configured to transmit signals received through second port 135. In this configuration, first port 105 may be referred to as a transmit port (Tx), third port 430 may be referred to as a receive port (Rx), and second port 135 may be referred to as a transmit/receive (T/R) port or antenna port.

Duplexer system 400 further comprises a duplexer circuit comprising first and second transmit filters 120 and 125 and first and second receive filters 405 and 410, and a receive block comprising first and second receive amplifiers 415 and 420, which are low noise amplifiers, and a combiner 425. Similar to first and second transmit filters 120 and 125, first and second receive filters 405 and 410 are designed with substantially matching electrical characteristics, such as matching phase and amplitude response. In addition, first and second receive amplifiers 415 and 420 are designed with substantially matching electrical characteristics.

During typical operation of duplexer system 400, a transmit signal is received at first port 105 and a receive signal is received at second port 135. The transmit signal is divided into first and second portions that are transmitted through respective first and second transmit paths between first port 105 and second port 135. The first and second portions of the transmit signal are recombined with each other in Wilkinson device 130. The receive signal is divided into first and second portions that are transmitted through respective first and second receive paths between second port 135 and third port 430. The first and second portions of the receive signal are recombined with each other in combiner 425.

The first transmit path comprises first power amplifier 110, which is a transmit amplifier, followed by first transmit filter 120, then Wilkinson device 130. The second transmit path comprises second power amplifier 115, which is a transmit amplifier, followed by second transmit filter 125, then Wilkinson device 130. The first receive path comprises Wilkinson device 130, followed by first receive filter 405, then first receive amplifier 415, then combiner 425. The second receive path comprises Wilkinson device 130, followed by second receive filter 410, then second receive amplifier 420, then combiner 425.

As in transmitter system 100, second port 135 (and/or other ports) may receive a jammer signal. The jammer signal at second port 135 can produce intermodulation products by mixing with the transmit signal at respective output ports of the first and second transmit filters 120 and 125 or by mixing with the receive signal at respective output ports of the first and second receive filters 405 and 410. Nevertheless, because the transmit and receive signals are each divided into two portions transmitted through different signal paths, power is distributed between two sets of components. This reduces the power density of the transmit signal in each of first and second transmit filters 120 and 125, and it also reduces the power density of the jammer signal impinging on these filters. Similarly, it reduces the power density of the receive signal in each of first and second receive filters 405 and 410, and it also reduces the power density of the jammer signal impinging on these filters. This reduction in power density tends to reduce the magnitude of intermodulation products that may affect the ACPR of duplexer system 400, and it can also increase the overall power handling of the transmit and receive filters by 3 dB.

Figure 5:
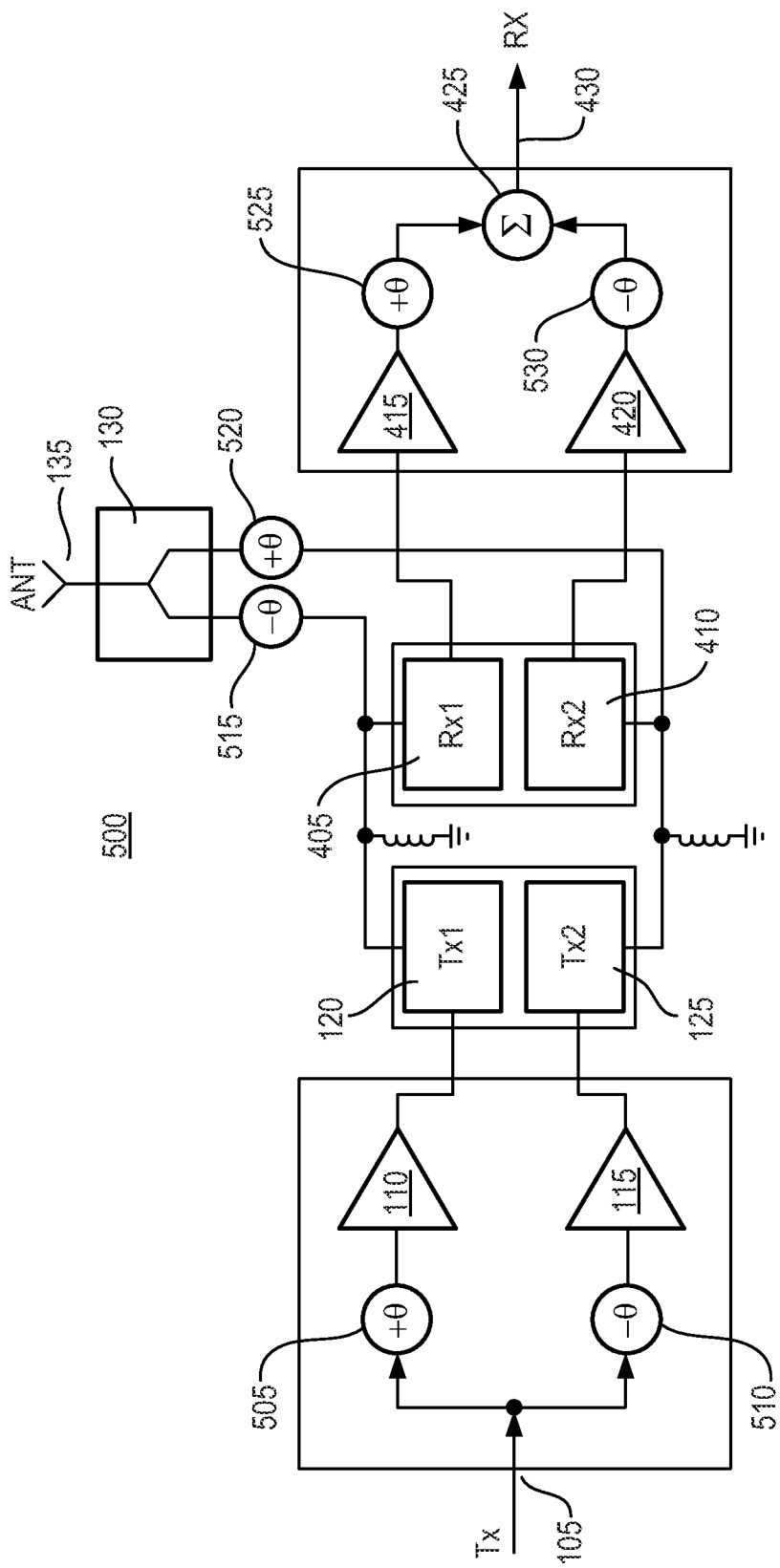
FIG. 5 is a diagram of a duplexer system configured to reduce intermodulation distortion according to another representative embodiment.

FIG. 5 is a diagram of a duplexer system 500 configured to reduce intermodulation distortion according to another representative embodiment. Duplexer system 500 is similar to duplexer system 400, except that it further reduces intermodulation distortion using phase shifters operating similar to the phase shifters illustrated in FIG. 2.

Referring to FIG. 5, duplexer system 500 comprises some of the same features as transmitter system 400 of FIG. 4, and a further description of those features will be omitted in order to avoid redundancy. Duplexer system 500 further comprises first through sixth phase shifters in the arrangement shown in FIG. 5. More specifically, a first phase shifter 505 is connected between transmit port 105 and first transmit power amplifier 110 and is configured to phase shift the first portion of the transmit signal by a first amount in a positive direction (i.e., +θ). A second phase shifter 510 is connected between transmit port 105 and second transmit amplifier 115 and is configured to phase shift the second portion of the transmit signal by approximately the first amount in a negative direction. A third phase shifter 525 is connected between receive third port 430 and the first receive amplifier and is configured to phase shift the first portion of the receive signal by approximately the first amount in the positive direction. A fourth phase shifter 530 is connected between receive third port 430 and second receive amplifier 420 and is configured to phase shift the second portion of the receive signal by approximately the first amount in the negative direction. A fifth phase shifter 515 is connected between first transmit filter 120 and T/R port 135 and between first receive filter 405 and T/R port 135 and is configured to phase shift the transmit signal and the receive signal by approximately the first amount in the negative direction. A sixth phase shifter 520 is connected between second transmit filter 125 and T/R port 135 and between second receive filter 410 and T/R port 135 and is configured to phase shift the transmit signal and the receive signal by approximately the first amount in the positive direction.

With the arrangement of phase shifters in duplexer system 500, the phase shift of the transmit signal through the first transmit path is substantially equal to the phase shift of the transmit signal through the second signal path. Consequently, the transmit signal is left intact at T/R port 135. Similarly, the phase shift of the receive signal through the first receive path is substantially equal to the phase shift of the receive signal through the second receive path. Consequently, the receive signal is left intact at receive third port 430. Moreover, if the phase shifts in duplexer system 500 are selected with appropriate magnitudes, intermodulation products in the first and second transmit paths may be offset from each other such that they substantially cancel each other out, and intermodulation products in the first and second receive paths may be offset from each other such that they substantially cancel each other out.

Figure 6:
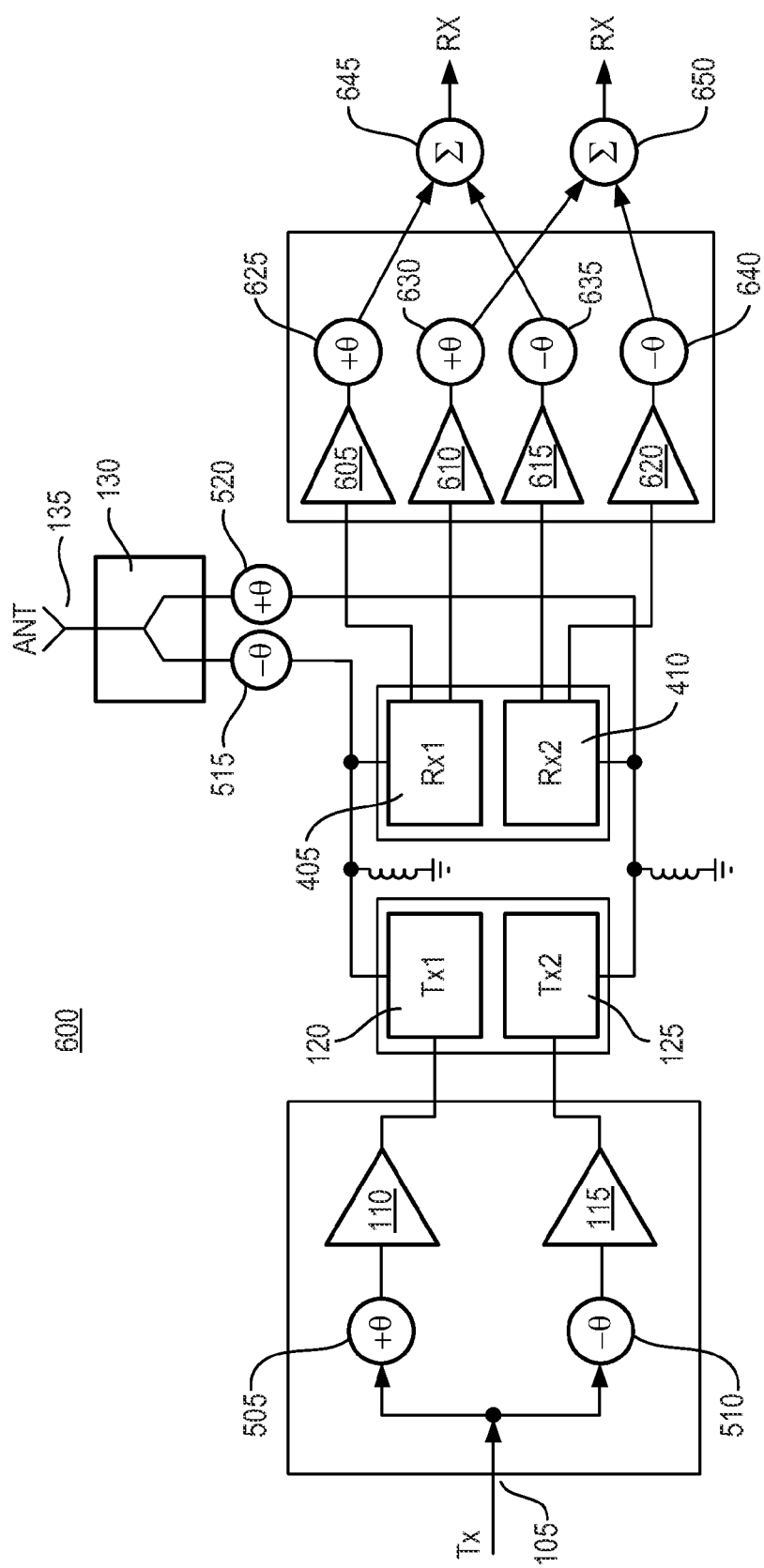
FIG. 6 is a diagram of a duplexer system configured to reduce intermodulation distortion according to another representative embodiment.

FIG. 6 is a diagram of a duplexer system 600 configured to reduce intermodulation distortion according to another representative embodiment. In duplexer system 600, each of the first and second receive filters 405 and 410 has a differential output port. Accordingly, it may be used in a context where it is desired for the receive signal to be transmitted via a differential receive port.

Referring to FIG. 6, duplexer system 600 comprises some of the same features as duplexer system 500 of FIG. 5, and a further description of those features will be omitted in order to avoid redundancy. Duplexer system 600 further comprises first through fourth amplifiers 605 through 610 connected to the differential output ports of first and second receive filters 405 and 410. Phase shifters 625 through 640 are connected between the respective first through fourth amplifiers 605 through 610 and first and second combiners 645 and 650. First and second combiners 645 and 650 receive respective positive and negative components of a differential signal pair, and it combines them to produce a differential signal (Rx+, Rx−).

Figure 7:
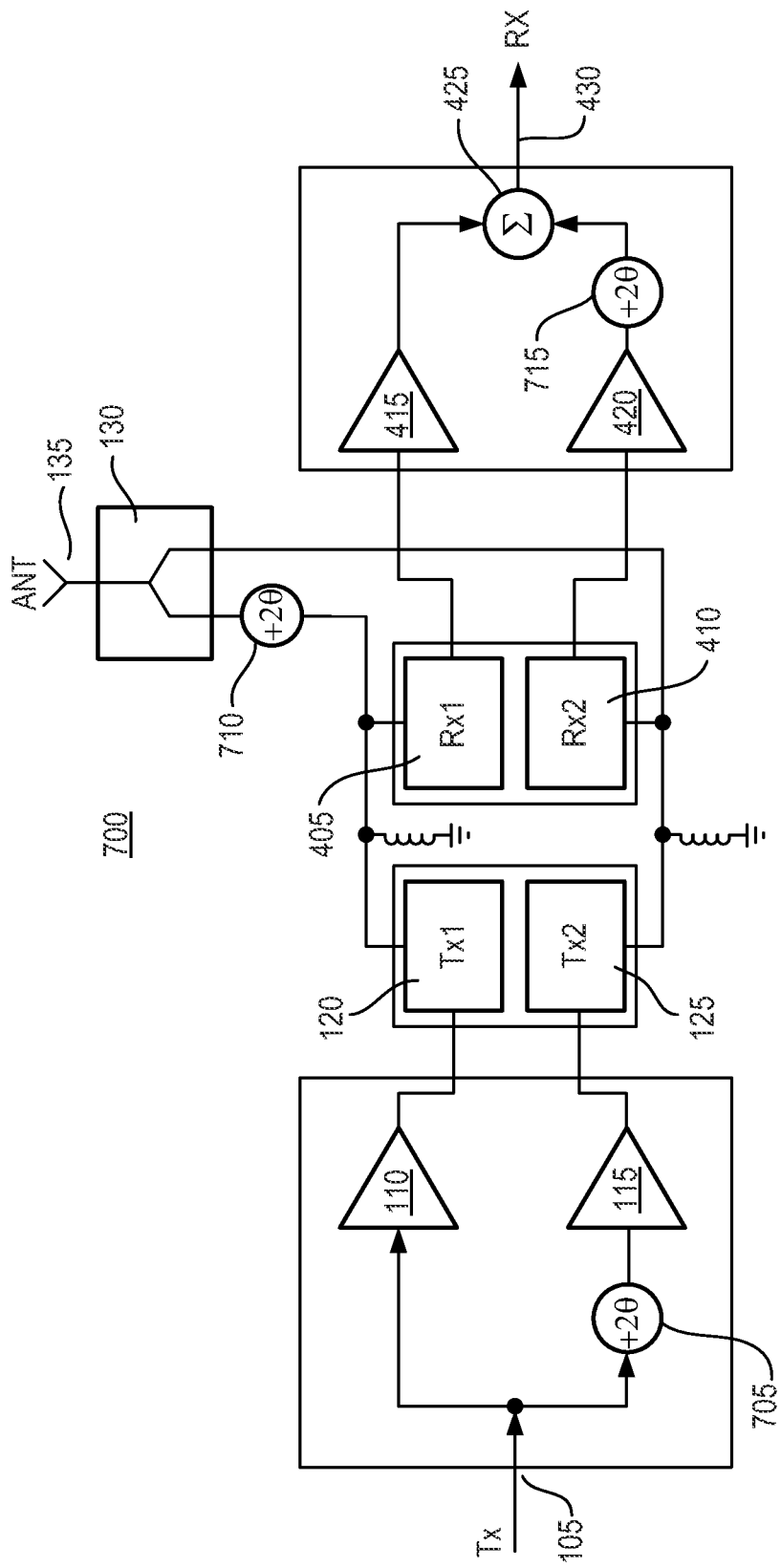
FIG. 7 is a diagram of a duplexer system configured to reduce intermodulation distortion according to another representative embodiment.

FIG. 7 is a diagram of a duplexer system 700 configured to reduce intermodulation distortion according to another representative embodiment. Duplexer system 700 is similar to duplexer system 500, but it reduces the total number of phase shifters by half. In particular, if the phase shift of each of the phase shifters of FIG. 5 is either increased by θ or decreased by θ, the resultant system may operate similar to duplexer system 500 with respect to the elimination of intermodulation products at one or more ports, as described above.

Referring to FIG. 7, duplexer system 700 comprises three phase shifters 705, 710, and 715 in contrast to the six phase shifters employed in duplexer system 500. Phase shifters 705, 710, and 715 all have a phase shift of +2θ. Duplexer system 700 may be obtained from duplexer system 500 by adding θ from the phase shifts of each of the phase shifters shown in FIG. 5. As a result, three of the phase shifters have a phase shift of zero, and may be eliminated, and θ may be selected, as with duplexer system 500, for elimination of one or more intermodulation products.

Figure 8:
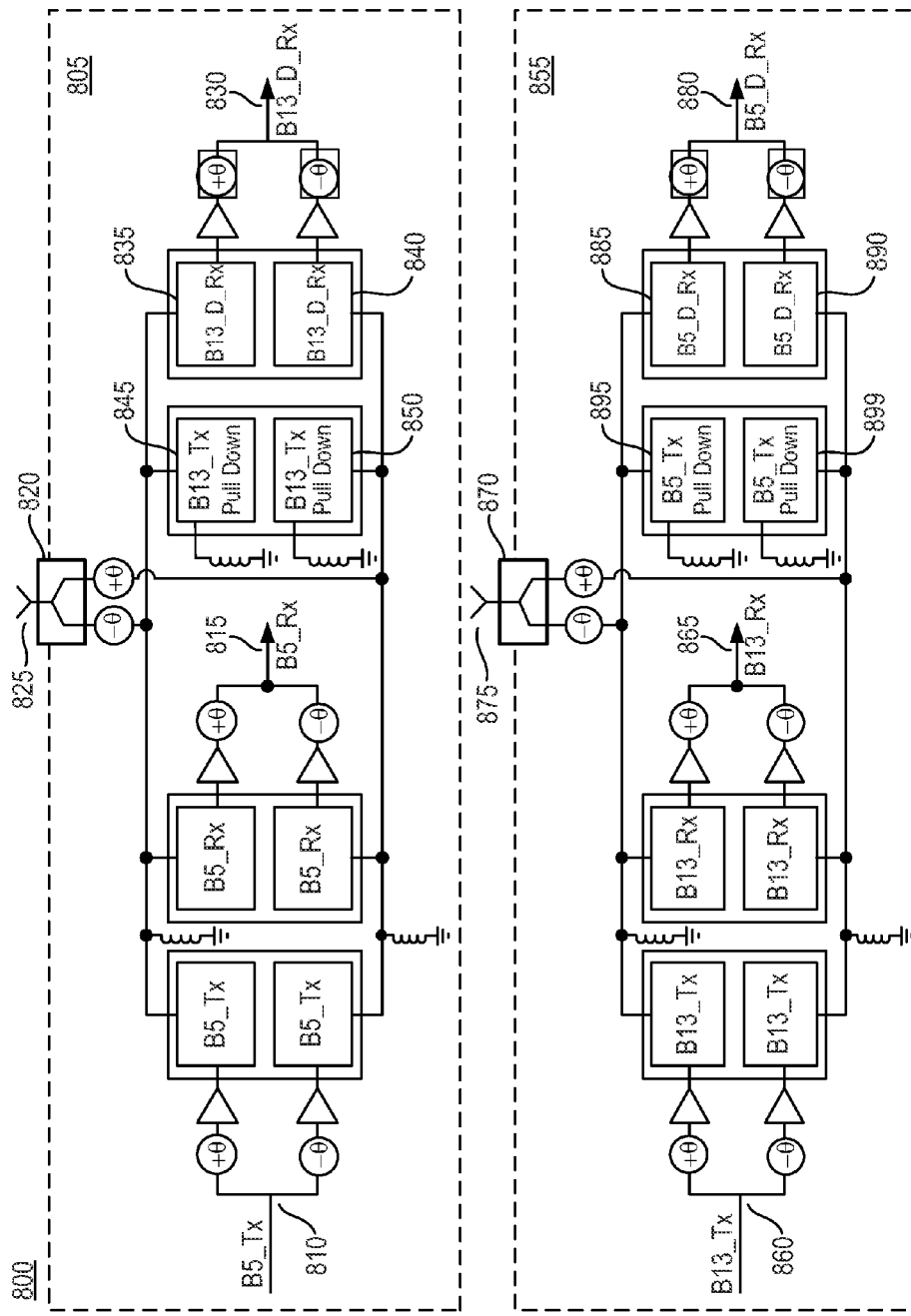
FIG. 8 is a diagram of a communication system configured to reduce intermodulation distortion according to a representative embodiment.

FIG. 8 is a diagram of a communication system 800 configured to reduce intermodulation distortion according to a representative embodiment. Communication system 800 comprises a pair of systems each having a double phase-matched configuration. Such a system can be used, for instance, to implement a multi-band mobile telephone that employs frequency diversity and operates in at least two frequency bands. In the example of FIG. 8, the two frequency bands are designated using the frequency band designators B5 and B13.

Referring to FIG. 8, communication system 800 comprises a first four-port system 805 and a second four-port system 855. First four-port system 805 and second four-port system 855 are each quadraplexers.

First four-port system 805 comprises a first port 810 that receives a transmit signal in a first transmit frequency band B5_TX, a second port 815 that outputs a receive signal in the first receive frequency band B5_RX, a third port 820 connected to a first antenna 825, and a fourth port 830 that outputs a diversity receive signal (B13_D_RX) in a second receive frequency band B13_RX.

Second four-port system 855 comprises a first port 860 that receives a transmit signal in a second transmit frequency band B13_TX, a second port 865 that outputs a receive signal in the second receive frequency band B13_RX, a third port 870 connected to a second antenna 875, and a fourth port 880 that outputs a diversity receive signal (B5_D_RX) in the first receive frequency band B5_RX.

First and second four-port systems 805 and 855 are each similar to duplexer system 500 shown in FIG. 5, and for simplification of the illustration, reference numerals of features in FIG. 8 that are the same as in FIG. 5 are not repeated in FIG. 8, and only those elements that differ from duplexer system 500 are labeled in FIG. 8. Also, for brevity a description of the portions of first and second four-port systems 805 and 855 that are the same as duplexer system 500 will not be repeated.

First four-port system 805 further comprises receive filters 835 and 840 each having a corresponding first and second device port, and first and second pull down devices 845 and 850 for impedance matching. These features are connected with the other features of system 805 as shown in the drawings. Where a jammer signal in the second transmit frequency band B13_TX is received at first antenna 825 (e.g., from second antenna 875), then first and second pull down devices 845 and 850 may reduce a voltage of the jammer signal at output ports of transmit and receive filters in first four-port system 805. This may reduce one or more intermodulation products at the second port 815 produced from mixing of the transmit signal received at first port 810 and the jammer signal.

Similarly, second four-port system 855 further comprises includes receive filters 885 and 890 (e.g., receive filters for the first receive frequency band B5_RX) each having a corresponding first device port and a corresponding second device port, and first and second pull down devices 895 and 899. These features are connected with the other features of second four-port system 855 as shown in the drawings. Where a jammer signal in the first transmit frequency band B5_TX is received at second antenna 875 (e.g., from first antenna 825), then first and second pull down devices 895 and 899 may reduce a voltage of the jammer or interfering signal at output ports of the transmit and receive filters in second four-port system 855. This may reduce one or more intermodulation products at the second port 865 produced from mixing of the transmit signal received at first port 860 and the jammer signal.

As with duplexer system 500, appropriate selection of the phase shift θ in first and second four-port systems 805 and 855 may allow an upper or lower intermodulation product to be eliminated, or substantially eliminated, at second ports 815 and 865. For example, if the phase shift θ is selected to be 22.5° or 45°, an upper or lower third order intermodulation product may be eliminated, or substantially eliminated, at second ports 815 and 865. In addition, the presence of amplifiers between the phase shifters and filters of first and second four-port systems 805 and 855 eliminates a need to include Wilkinson devices at the corresponding ports.

In various alternative implementations of communication system 800, first and second four-port systems 805 and 855 may be altered according to one or more of the variations described above with respect to FIGS. 4-7. Moreover, various features from the above and other embodiments can be combined, augmented, omitted, or otherwise modified according to various design choices, specifications, or contexts, as will be apparent to those skilled in the art.

Figure 9:
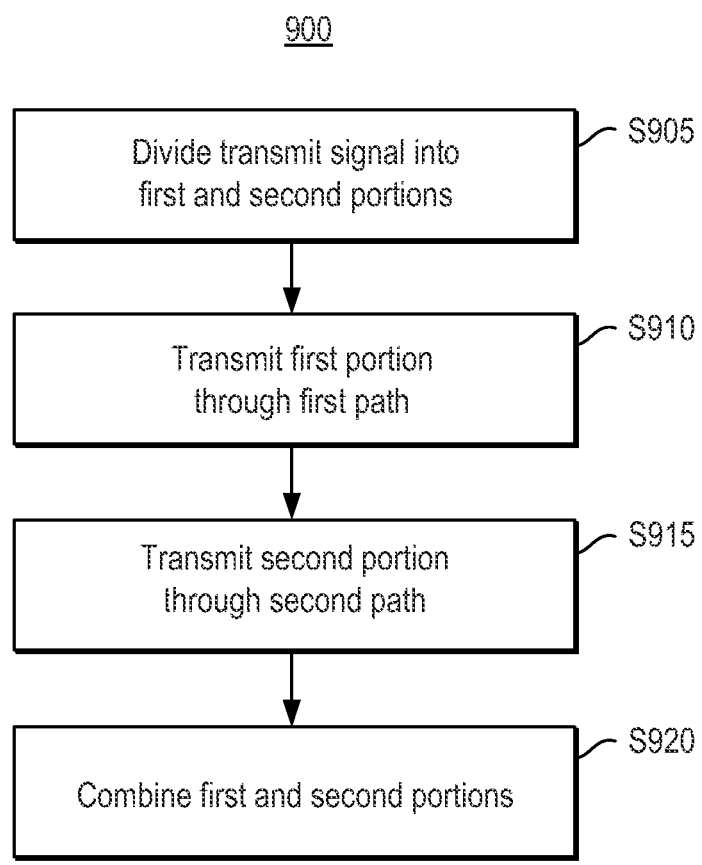
FIG. 9 is a flowchart of a method of communicating radio frequency signals with reduced intermodulation distortion according to a representative embodiment.

FIG. 9 is a flowchart of a method 900 of communicating radio frequency signals with reduced intermodulation distortion according to a representative embodiment. The method of FIG. 9 can be performed, for instance, by one or more of the systems or devices described with reference to FIGS. 1-8.

Referring to FIG. 9, the method comprises dividing a transmit signal into first and second portions (S905). This can be accomplished, for instance, by transmitting half of the signal power to one portion of a circuit and transmitting the other half of the signal power to another portion of the circuit. The method further comprises transmitting the first portion of the transmit signal through a first transmit path arranged between a first port and a second port and comprising a first transmit amplifier followed by a first passive device (S910), and transmitting the second portion of the transmit signal through a second transmit path arranged between the first port and the second port and comprising a second transmit amplifier followed by a second passive device (S915). Examples of these transmissions include, for instance, communications between first and second ports 105 and 135 in FIGS. 1-8 above. Finally, the method comprises combining the first and second portions of the transmit signal and transmitting a resulting signal to the second port (S920). This combining can be performed, for instance, by Wilkinson device 130 of FIGS. 1-8.

In addition to transmitting the transmit signal through first and second transmit amplifiers as described above, the method may also perform phase shifting as described above in relation to FIGS. 1-8 in order to reduce intermodulation distortion through destructive interference. Moreover, although not specifically illustrated in FIG. 9, similar operations can be performed to divide a receive signal into multiple portions and to process the divided portions to reduce intermodulation distortion.

As described above, two-port, three-port, four-port (or more) port systems may be configured to eliminate, or substantially eliminate, an tipper or lower intermodulation product by adopting the double phase-matched configuration as described herein with the inclusion of phase shift devices, and with an appropriate choice of phase shift values for the phase shift devices. For example, some embodiments may exhibit an improvement of 20 dB or more in intermodulation performance without incurring the severe insertion loss penalty that would typically be incurred if a narrow passband or band reject filter was employed to reduce the intermodulation product. In addition, certain embodiments can provide reduced insertion loss at certain ports of the systems without the use of Wilkinson devices. For example, the reduced insertion loss can be achieved by placing amplifiers between the phase shifters and passive devices. Furthermore, in some embodiments a substantial reduction in the magnitude of the intermodulation product may be provided even in cases where the intermodulation product is very close in frequency to a signal that is desired to be processed by the system as a transmit or receive signal. For example, in some embodiments a substantial reduction in the magnitude of the intermodulation product may be provided when this separation is as little as 1 MHz at a nominal frequency of several hundred MHz or more—something that would be difficult or impractical with conventional filtering techniques. Finally, in some embodiments the substantial reduction in the magnitude of the intermodulation product may be relatively insensitive to the actual value selected for the phase shift.

While example embodiments are disclosed herein, one of ordinary skill in the art appreciates that many variations that are in accordance with the present teachings are possible and remain within the scope of the appended claims. The embodiments therefore are not to be restricted except within the scope of the appended claims.

The invention claimed is:

1. A system, comprising:
   a first port configured to receive a transmit signal;
   a second port configured to transmit the transmit signal;
   a first transmit path configured to transmit a first portion of the transmit signal from the first port to the second port and comprising a first transmit amplifier followed by a first frequency filter; and
   a second transmit path configured to transmit a second portion of the transmit signal from the first port to the second port and comprising a second transmit amplifier followed by a second frequency filter, wherein the first and second frequency filters have substantially the same phase responses and amplitude responses as each other.

2. The system of claim 1, further comprising:
   a first phase shifter connected between the first port and the first transmit amplifier and configured to phase shift the first portion of the transmit signal by a first amount in a positive direction;
   a second phase shifter connected between the first port and the second transmit amplifier and configured to phase shift the second portion of the transmit signal by the first amount in a negative direction;

a third phase shifter connected between the first frequency filter and the second port and configured to phase shift the first portion of the transmit signal by the first amount in the negative direction; and a fourth phase shifter connected between the second frequency filter and the second port and configured to phase shift the second portion of the transmit signal by the first amount in the positive direction.

3. The system of claim 1, further comprising:
a first phase shifter connected between the transmit port and the first transmit amplifier and configured to phase shift the first portion of the transmit signal by a first amount in a first direction; and
a second phase shifter connected between the second frequency filter and the second port and configured to phase shift the second portion of the transmit signal by the first amount in the first direction.

4. A system, comprising:
a first port configured to receive a transmit signal;
a second port configured to transmit the transmit signal;
a first transmit path configured to transmit a first portion of the transmit signal from the first port to the second port and comprising a first transmit amplifier followed by a first passive device; and
a second transmit path configured to transmit a second portion of the transmit signal from the first port to the second port and comprising a second transmit amplifier followed by a second passive device, wherein the first and second passive devices have substantially the same electrical characteristics as each other,
wherein the first port is a transmit port and the second port is a transmit/receive (T/R) port, and wherein the T/R port is further configured to receive a receive signal, the system further comprising:
a first receive path configured to transmit a first portion of the receive signal from the T/R port to a receive port and comprising a third passive device followed by a first receive amplifier; and
a second receive path configured to transmit a first portion of the receive signal from the T/R port to the receive port and comprising a fourth passive device followed by a first receive amplifier, wherein the third and fourth passive devices have substantially matched electrical characteristics.

5. The system of claim 4, further comprising:
a first phase shifter connected between the transmit port and the first transmit amplifier and configured to phase shift the first portion of the transmit signal by a first amount in a positive direction;
a second phase shifter connected between the transmit port and the second transmit amplifiers and configured to phase shift the second portion of the transmit signal by approximately the first amount in a negative direction;
a third phase shifter connected between the receive port and the first receive amplifier and configured to phase shift the first portion of the receive signal by approximately the first amount in the positive direction;
a fourth phase shifter connected between the receive port and the second receive amplifier and configured to phase shift the second portion of the receive signal by approximately the first amount in the negative direction;
a fifth phase shifter connected between the first passive device and the T/R port and between the third passive device and the T/R port and configured to phase shift the respective first portions of the transmit signal and the receive signal by approximately the first amount in the negative direction; and
a sixth phase shifter connected between the second passive device and the T/R port and between the fourth passive device and the T/R port and configured to phase shift the respective first portions of the transmit signal and the receive signal by approximately the first amount in the positive direction.

6. The system of claim 5, further comprising:
a combining device connected between the T/R port and the first and second passive devices and configured to combine the first and second portions of the transmit signal to produce the transmit signal at the T/R port; and
a splitting device connected between the T/R port and the third and fourth passive devices and configured to split the receive signal to produce the first and second portions of the receive signal transmitted through the respective first and second receive pathways.

7. The system of claim 6, wherein the combining device and the splitting device comprise a single Wilkinson device.

8. The system of claim 4, wherein the T/R port is connected to an antenna configured to transmit the transmit signal and receive the receive signal.

9. The system of claim 4, wherein the first and second passive devices are formed on a first chip, and the third and fourth passive devices are formed on a second chip.

10. The system of claim 4, wherein at least one of the first through fourth passive devices comprises an acoustic resonator.

11. The system of claim 4, wherein the first and second transmit amplifiers each comprise a power amplifier, and the first and second receive amplifiers each comprise a low noise amplifier.

12. The system of claim 4, wherein the first and third passive devices form a first duplexer, and the second and fourth passive devices form a second duplexer.

13. The system of claim 2, wherein the first amount is approximately 22.5 degrees.

14. The system of claim 5, wherein the first amount is one of: approximately 22.5 degrees and approximately 45 degrees.

15. A method, comprising:
dividing a transmit signal into first and second portions;
transmitting the first portion of the transmit signal through a first transmit path arranged between a first port and a second port and comprising a first transmit amplifier followed by a first frequency filter;
transmitting the second portion of the transmit signal through a second transmit path arranged between the first port and the second port and comprising a second transmit amplifier followed by a second frequency filter, wherein the first and second frequency filters have substantially the same phase responses and amplitude responses as each other; and
combining the first and second portions of the transmit signal and transmitting a resulting signal to the second port.

16. The method of claim 15, wherein the first transmit path further comprises a first phase shifter connected between the first port and the first transmit amplifier and configured to phase shift the first portion of the transmit signal by a first amount in a positive direction, and a second phase shifter connected between the first frequency filter and the second port and configured to phase shift the first portion of the transmit signal by the first amount in the negative direction; and wherein the second transmit path further comprises a third phase shifter connected between the transmit port and the second transmit amplifier and configured to phase shift the second portion of the transmit signal by the first amount in a negative direction, and a fourth phase shifter connected between the second frequency filter and the second port and configured to phase shift the second portion of the transmit signal by the first amount in the positive direction.

17. The method of claim 15, further comprising:

dividing a receive signal into first and second portions;

transmitting the first portion of the receive signal through a first receive path arranged between the second port and a third port and comprising a first receive amplifier followed by a third passive device;

transmitting the second portion of the receive signal through a second receive path arranged between the second port and the third port and comprising a second transmit amplifier followed by a fourth passive device; and combining the first and second portions of the receive signal and transmitting a resulting signal to the third port.

18. The method of claim 17, further comprising:

phase shifting the first portion of the transmit signal by a first amount in a positive direction using a first phase shifter arranged between the first port and the first transmit amplifier;

phase shifting the second portion of the transmit signal by approximately the first amount in a negative direction using a second phase shifter arranged between the first port and the second transmit amplifier;

phase shifting the first portion of the receive signal by approximately the first amount in the positive direction using a third phase shifter arranged between the third port and the first receive amplifier;

phase shifting the second portion of the receive signal by approximately the first amount in the negative direction using a fourth phase shifter arranged between the third port and the second transmit amplifier;

phase shifting the respective first portions of the transmit signal and the receive signal by approximately the first amount in the negative direction using a fifth phase shifter connected between the first frequency filter and the second port and between the third passive device and the second port; and phase shifting the respective second portions of the transmit signal and the receive signal by approximately the first amount in the positive direction using a sixth phase shifter connected between the second frequency filter and the second port and between the fourth passive device and the second port.

19. The method of claim 17, wherein the first and second portions of the transmit signal are combined using a Wilkinson device, and the receive signal is divided into first and second portions by the Wilkinson device.

20. The method of claim 17, wherein the third and fourth passive devices comprise frequency filters.

* * * * *